United States Patent [19]

McGee et al.

[11] 4,349,205

[45] Sep. 14, 1982

[54] ANNULUS SEALING DEVICE WITH ANTI-EXTRUSION RINGS

[75] Inventors: John K. McGee; Charles D. Bridges, both of Houston, Tex.

[73] Assignee: Combustion Engineering, Inc., Windsor, Conn.

[21] Appl. No.: 265,223

[22] Filed: May 19, 1981

[51] Int. Cl.³ .................... F16J 15/18; F16J 15/32
[52] U.S. Cl. .................... 277/188 A; 277/117; 277/125; 277/152
[58] Field of Search .............. 277/117, 119, 120, 121, 277/123–124, 188 R, 152, 188 A, 153, 190, 165, 191, 193

[56] References Cited

U.S. PATENT DOCUMENTS

| 3,132,869 | 5/1964 | Campbell | 277/188 A X |
| 4,052,112 | 10/1977 | Faber | 277/188 A X |
| 4,059,280 | 11/1977 | Eastwood | 277/188 A |

FOREIGN PATENT DOCUMENTS

| 506965 | 11/1954 | Canada | 277/188 R |
| 224101 | 11/1924 | United Kingdom | 277/188 R |
| 1316842 | 5/1973 | United Kingdom | 277/188 A |

Primary Examiner—Robert S. Ward, Jr.
Attorney, Agent, or Firm—Cushman, Darby & Cushman

[57] ABSTRACT

For sealing between an inner part and an outer part which are generally concentrically related so as to have an annulus between them, an elastomeric sealing annulus is axially sandwiched between two beveled anti-extrusion rings, each of which has a deflectable lip. There is a first running clearance radially between this assembly and the bore of the outer part, and a second running clearance between this assembly and the outer peripheral surface of the inner part. When the two parts and the sealing assembly all reach their intended relative positions the seal is established by axially compressing the assembly sufficiently to significantly de-bevel both of the anti-extrusion rings, deflect their lips into contact with one of the parts while urging their opposite edges into contact with the other of the parts. As the elastomeric sealing annulus is axially compressed it expands radially inwards and outwards into resilient sealing engagement with the two parts.

18 Claims, 10 Drawing Figures

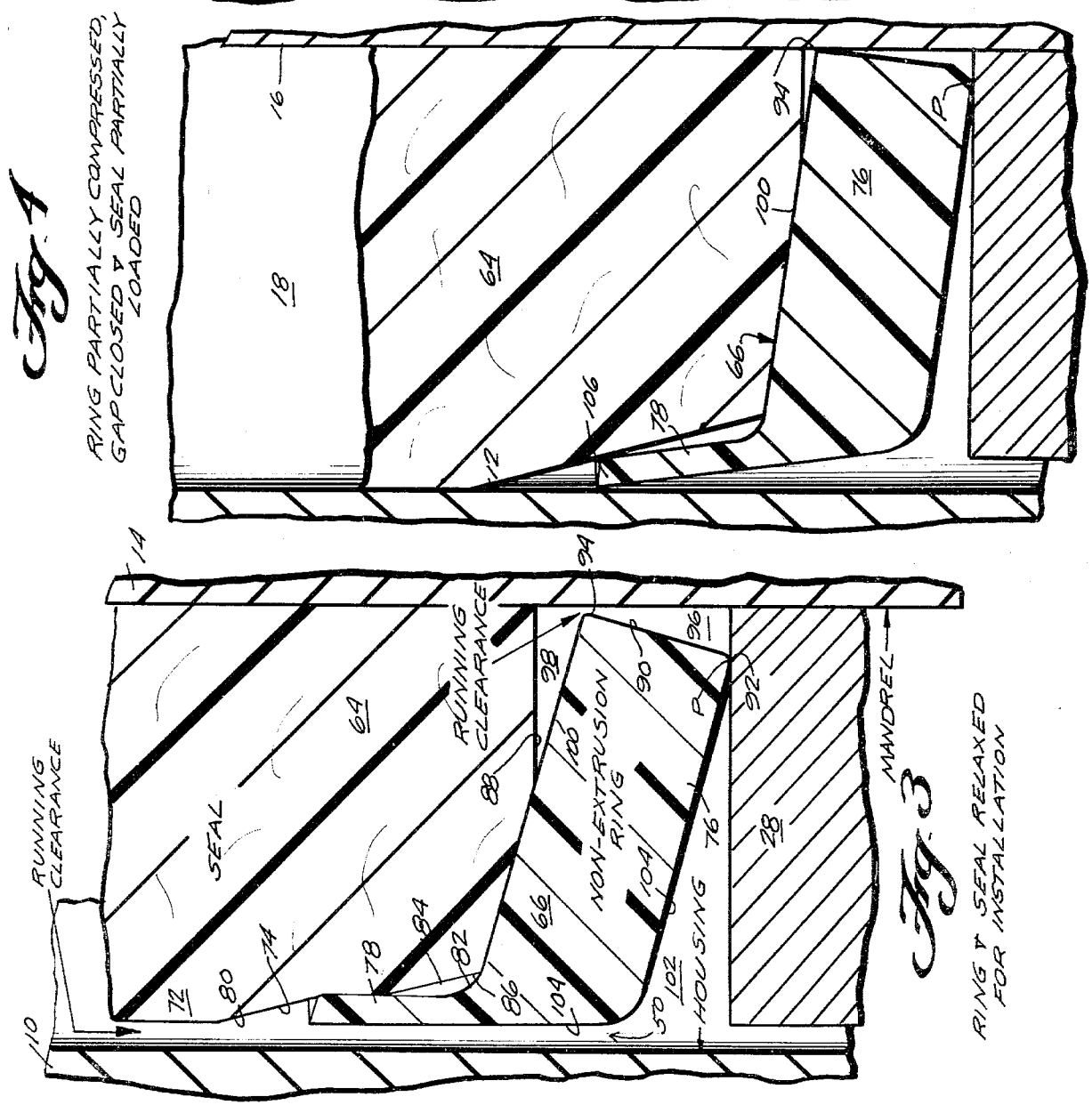

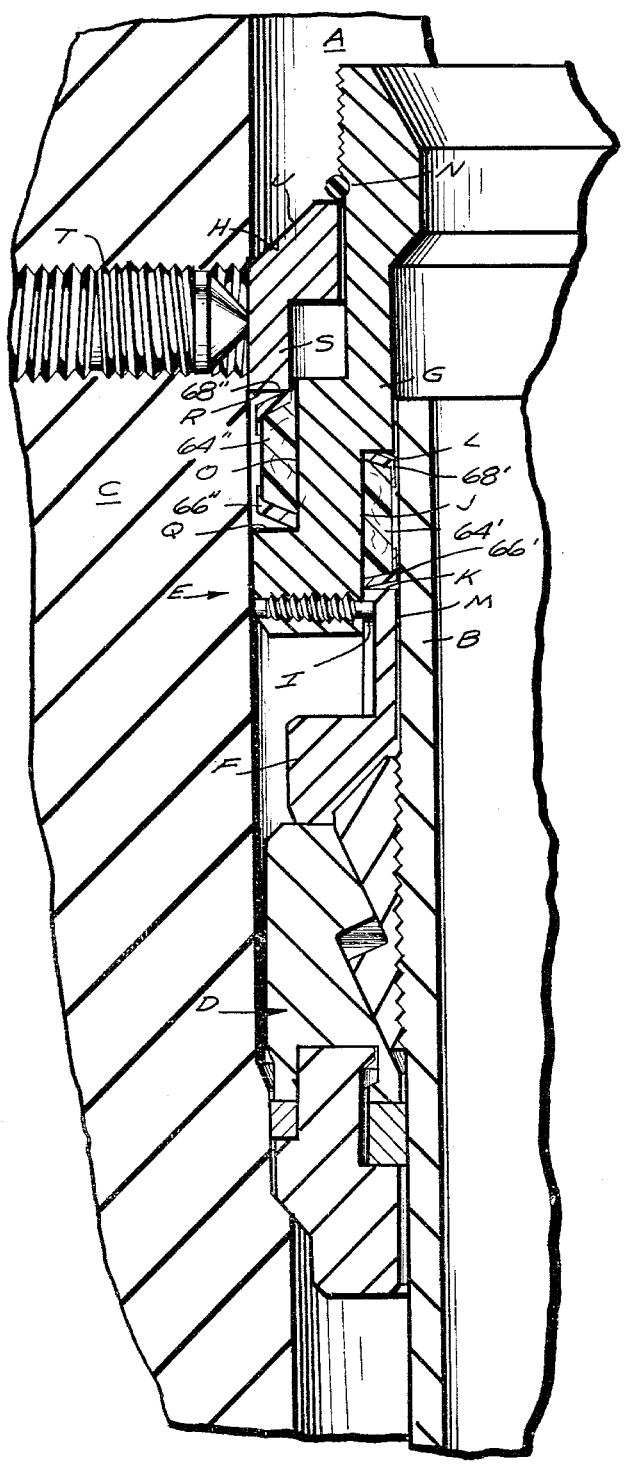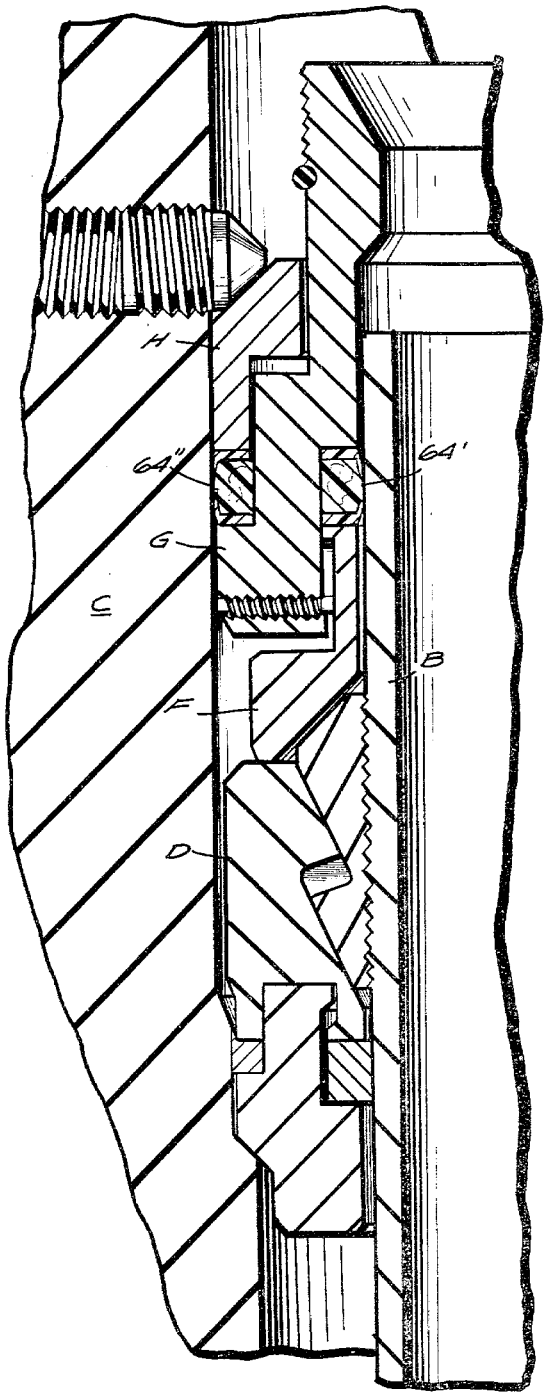

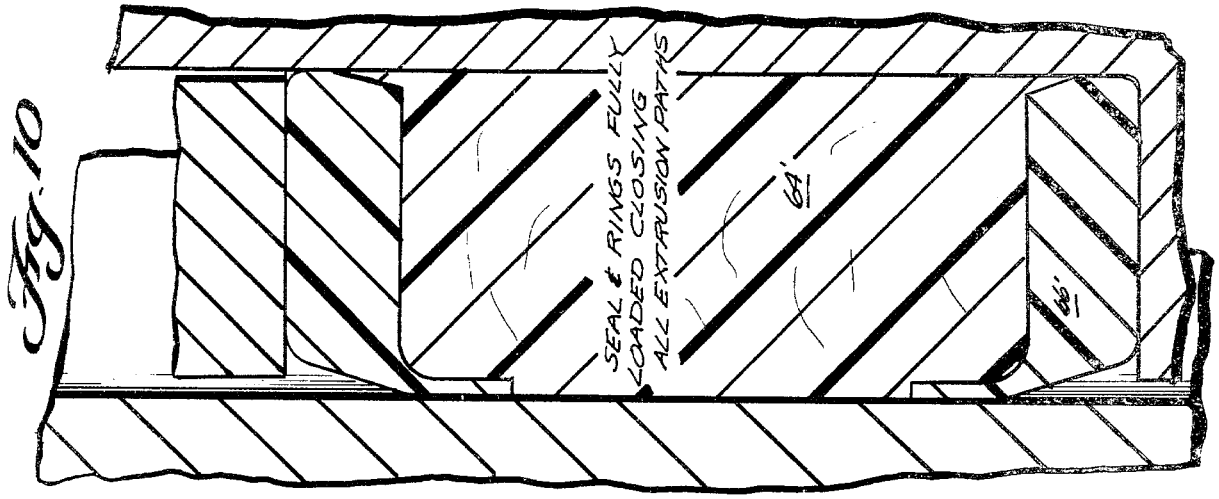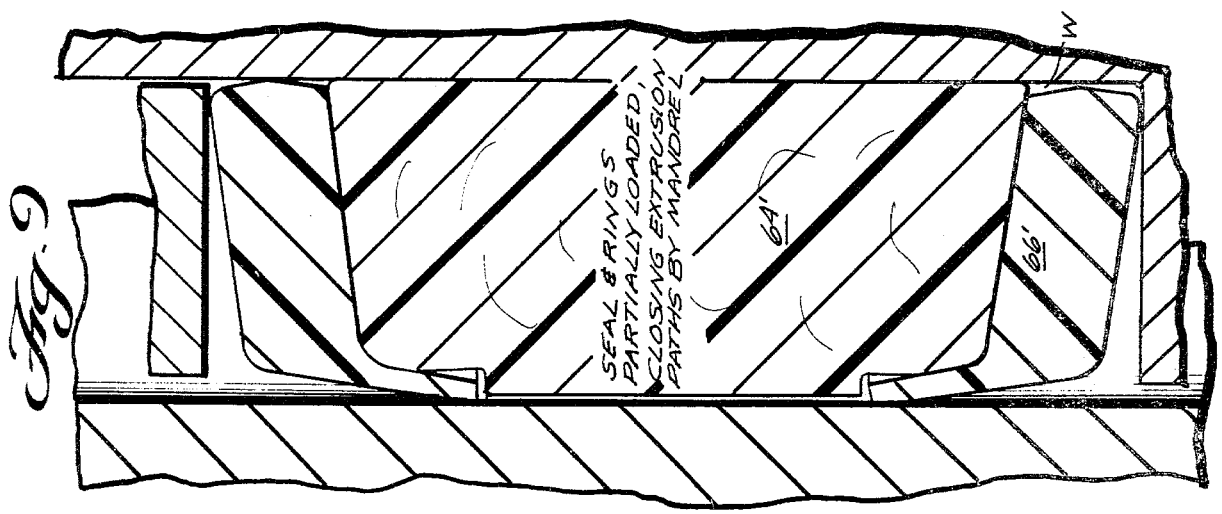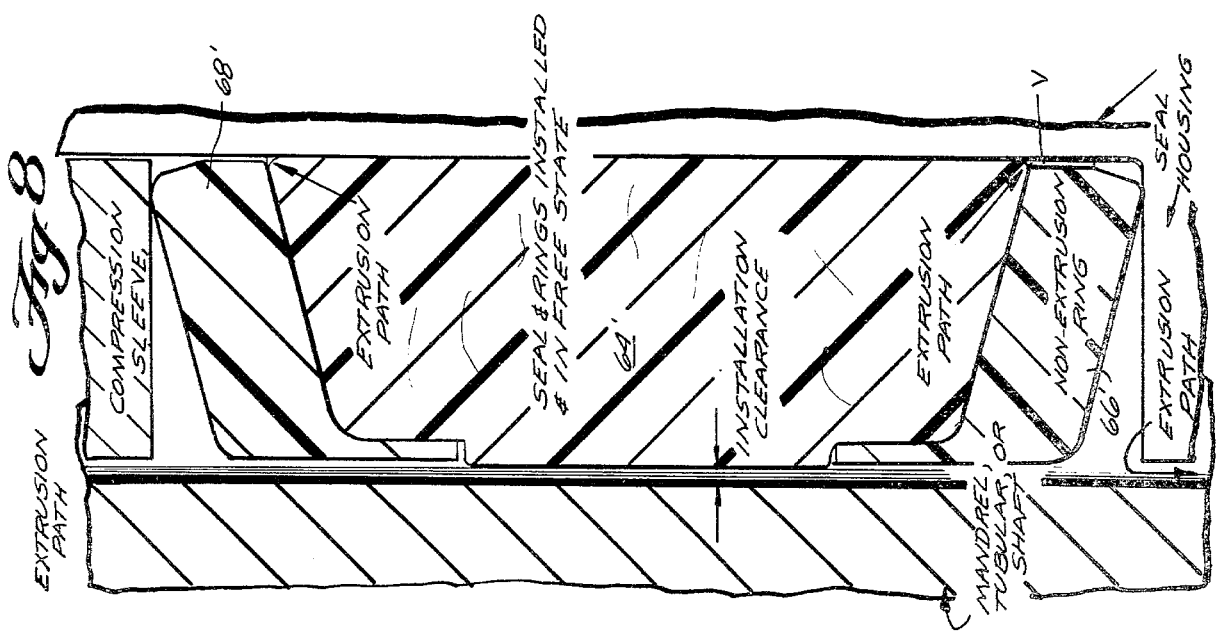

4,349,205

ANNULUS SEALING DEVICE WITH ANTI-EXTRUSION RINGS

BACKGROUND OF THE INVENTION

In numerous industrial situations, there is a need to form a seal between two concentric round structures, for instance between the exterior of a pipe and the throughbore of a housing in which the pipe is disposed, or between two coaxially related pipes one of which is partially surrounded by the other so that there is an annular, cylindrical space defined between them. Sometimes all or most of a sealing device for forming such a seal is run into the annulus with one of the pipes, and then set after the desired relative longitudinal positioning of the pipes has been achieved. Other times all or most of the sealing device is run into the annulus, separately, after the pipes are in place, and then set.

Conventional uses of some conventional sealing devices which are made to be used in forming such annular seals often present at least some of the following problems: that the seal elements are destroyed by the pressures to which they are subjected during make-up or use; that metal seal rings cut-into the surfaces against which they seat; that running and/or retrieval is difficult because of the dragging effect of some element or elements of the sealing device against at least one of the parts with which it is to seal; that in order to test whether the sealing device has been satisfactorily set it is necessary to place more of a compression load upon some other item of equipment located in the inter-conduit annulus than that item of equipment should prudently be called-upon to bear; that the sealing device has a narrow operating temperature range due to differential expansion/contraction between one or more of the sealing elements and one or both of the pipes or the like; that one or both of the pipes or the like must be provided with a bowl or shoulder where the pipe or the like has an abrupt increase or decrease in internal or external diameter; and that the sealing device is difficult or impossible to correctly install in some instances because the two pipes are not precisely concentrically disposed, or one or both are not precisely circular, or one or both of the pipe surfaces is or are rough in places.

The sealing device of the present invention was devised to overcome these drawbacks.

SUMMARY OF THE INVENTION

For sealing between an inner part and an outer part which are generally concentrically related so as to have an annulus between them, an elastomeric sealing annulus is axially sandwiched between two beveled anti-extrusion rings, each of which has a deflectable lip. There is a first running clearance radially between this assembly and the bore of the outer part, and a second running clearance between this assembly and the outer peripheral surface of the innerpart. When the two parts and the sealing assembly all reach their intended relative positions the seal is established by axially compressing the assembly sufficiently to significantly de-bevel both of the anti-extrusion rings, deflect their lips into contact with one of the parts while urging their opposite edges into contact with the other of the parts. As the elastomeric sealing annulus is axially compressed it expands radially inwards and outwards into resilient sealing engagement with the two parts.

The principles of the invention will be further discussed with reference to the drawings wherein preferred embodiments are shown. The specifics illustrated in the drawings are intended to exemplify, rather than limit, aspects of the invention as defined in the claims.

BRIEF DESCRIPTION OF THE DRAWINGS

In the Drawings

FIGS. 3, 4 and 5 are larger scale fragmentary longitudinal sectional views of the sealing device located in place, showing the sealing device successively fully relaxed, partially and fully loaded.

FIG. 6 is a fragmentary longitudinal sectional view similar to FIG. 1, but of another embodiment;

FIG. 7 is a fragmentary longitudinal sectional view similar to FIG. 2 of this second embodiment; and FIGS. 8, 9 and 10 are larger scale fragmentary sectional views similar to FIGS. 3–5, but, of the second embodiment.

DETAILED DESCRIPTION

Figure 2:
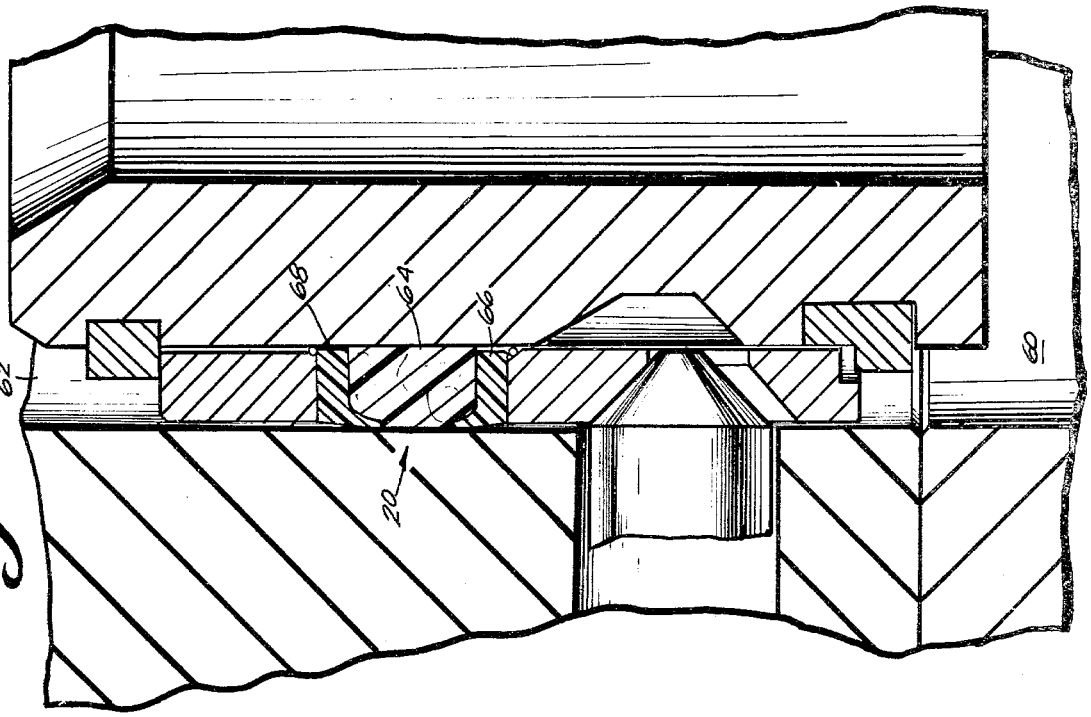
FIG. 2 is a fragmentary longitudinal sectional view similar to FIG. 1, showing the sealing device after it has been loaded.

In FIGS. 1–5, item 10 is a radially outer fluid-confining member, e.g. a pipe or a petroleum casing head, tubing head or pressure vessel sidewall or the like, having a circumferentially extending, radially inwardly facing inner surface 12, e.g. the inner peripheral surface of a bore, throughbore, recess, cavity, well, socket or the like. Item 14 is a radially inner fluid-confining member, e.g. a pipe or a closure, hatch cover, bonnet, inner well-head part or the like, having a circumferentially extending, radially outwardly facing outer surface 16, e.g. the outer peripheral surface of a sidewall portion of the part 14.

Typically both the surface 12 and the surface 16 are circularly cylindrically curved. The surface 16 of the inner part 14 is generally concentrically, coaxially located within the outer part 10 so that it is spaced radially inwardly of the surrounding surface 12 and so that an annular space 18 is formed radially between the surfaces 12 and 16.

Figure 1:
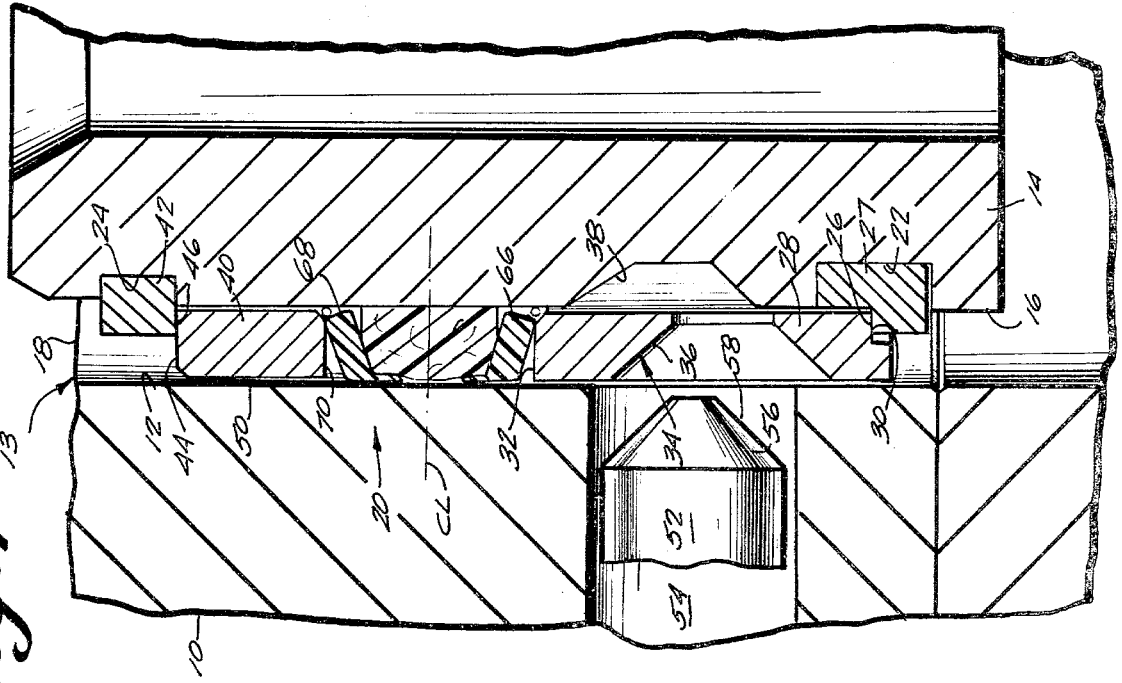
FIG. 1 is a fragmentary longitudinal sectional view of two pipes or the like having a sealing device of the invention located in place annularly between them, but not yet loaded.

A sealing device 20 constructed and provided in accordance with principles of the present invention is shown received in the annular space 18. Referring to FIG. 1, in this first embodiment, the sealing device 20 is pre-assembled to the inner fluid confining member 14 with the aid of additional structures. In particular, the outer surface 16 of the member 14, typically a hanger mandrel of a petroleum wellhead, is shown provided with a lower, radially outwardly opening circumferential groove 22 of generally rectangular cross-section, and a similar upper groove 24. In order to provide the member 14 with a lower, external axially upwardly facing ledge which protrudes radially into the annular space 18 to provide a shoulder 26, a first snap ring 27 is forcibly-expanded, lowered over the member 14 and allowed to self-contract into the groove 22. Next, a tubular lower retaining band 28 is lowered over the member 14 until the axially downwardly facing annular shoulder 30 at the radially inner margin of its lower end comes to rest on the shoulder 26. This band 28 is shown also having an axially upwardly facing annular shoulder 32 provided as an upper end surface thereof. Intermediate its ends, the band 28 is provided with a plurality of equi-angularly spaced, radially outwardly opening radially inwardly tapering detents or recesses 34, e.g. of frusto-conical form (only one of e.g. four being illustrated). Accordingly, these recess means 34 are provided with surface means 36 oriented so as to provide a guiding, centering function as is further described hereinbelow.

The surface 16 of the member 14 is further shown provided at a level intermediate those of the grooves 22 and 24 with a broad, notch-like circumferential groove 38 which is located so as to be generally in registry with the series of recesses 34.

The sealing device 20 is then slid down over the member 14 until it comes to rest on the upper end 32 of the lower retaining band 28.

Finally, a tubular upper retaining band 40 is slid down about the member 14 until it comes to rest on the sealing device 20 and a second, upper snap ring 42 is snapped into the groove 24. At this stage the upper end surface 44 of the upper retaining band 40 either engages the downwardly facing annular shoulder 46 provided by the upper snap ring 42 or is located only very slightly axially therebelow and in axially interfering relation therewith.

With the sealing device 20 thus assembled to the inner member 14 in a relaxed state, the inner member 14 can be run into the bore 13 of the outer member 10. At this state, the parts 28, 20 and 40 each have respective inner diameters that are at least slightly larger than the outer diameter of the surface 16 and respective outer diameters that are at least slightly smaller than the inner diameter of the surface 12. The snap rings 27 and 42, when seated, project radially outwards only about half the width of the annular space 18.

Thus, as the member 14 with the relaxed sealing device assembly 48 (constituted by the parts 27, 28, 20, 40, 42) mounted thereon is run into the bore 13 of the part 10, a running clearance gap 50 exists. This running clearance is available to compensate for any tolerable irregularities in the surface 12 of the bore 13.

Notice now that the outer fluid-confining member 10 is provided with means for operating the seal assembly 20. In this embodiment, this means includes a plurality of set screws 52, each identical to the one shown, and all equi-angularly distributed in correspondence with the recesses 34. It is not unusual to provide set screws in the housing members of wellheads, e.g. in casing heads, so the whole environment of the set screw 52 is not illustrated in detail. In general, for each set screw 52, the member 10 is provided with a horizontal, radially directed passageway 54. In each passageway, a set screw is received, nose end 56 in first. The unshown body of the set screw typically is sealingly mounted in a plug fitted in the radially outer end of the passageway 54. A stem portion of the set screw extends radially outwardly beyond the plug and carries a wrenching surface which, if rotated in one sense, advances the set screw and which, if rotated in the opposite sense retracts the set screw. It is not unusual for set screws of this type to have a mechanical mechanism between the stem and nose portions thereof which isolates the rotational motion from the nose portion, so that when the stem is rotated, the set screw nose correspondingly advances radially inwards or retracts radially outwards, but does not itself rotate at all.

In the first embodiment as shown in FIGS. 1 and 3, at the time when the inner member 14 with the assembly 48 is run into the bore 13, the set screws 52 are in a sufficiently retracted condition that the noses 56 do not project into the annular space 18 at all, and lie fully within the respective passageways 54. Each set screw nose portion 56 includes a forwardly presented guide surface 58, in this instance a generally forwardly tapering frusto-conical annular surface that is coaxial with the longitudinal axis of the respective set screw. That is, each nose tends to come to a point that is aimed towards the shared longitudinal axis of the fluid confining members 10 and 14.

Somewhere, e.g. below the cut-off level of FIG. 1, there is a means for achieving a pre-established relative longitudinal relationship of the members 10 and 14. For instance, the outer member 10 may have an upwardly facing internal shoulder upon which a downwardly facing external shoulder on the inner member comes to rest as the inner member is lowered by the pre-established amount into the bore 13. It happens, by choice, that at this level, as can best be seen by turning FIG. 1 sideways and looking along the axis of the set screw nose 56 toward the lower retaining band 28, the nose is angularly and axially aligned to enter the corresponding recess 34, but its guide surface 58 is off-center with respect to the guide surface 36 of that corresponding recess 34. In fact, at this point the recesses 34 are somewhat too low for the noses 56 to freely enter them. What happens as a result can best be seen by looking at FIGS. 1 and 3 together, then 4, and then at FIGS. 2 and 5 together, in sequence.

(FIG. 3 shows, on a larger scale, part of what is shown in FIG. 1 and FIG. 5 shows on a larger scale what is shown in FIG. 2. Thus the sequence progresses from the seal fully-relaxed stage shown in FIGS. 1 and 3, through the seal partially-loaded stage shown in FIG. 4, to the seal fully-loaded stage shown in FIGS. 2 and 5).

Accordingly, as the set screws 52 are run-in, the guide surfaces 58 on the noses 56 come into contact with the guide surfaces 36 of the recesses 34 in an eccentric manner—tops touching tops. Then, as the set screws are run-in further, the guiding effect provided by the shapes of the engaging surfaces causes the lower retaining band 28 to be forced to move axially upwards by an amount directly proportional to how much more the set screws 52 are run in. In effect, this upward movement of the lower retaining band can only be accomplished by reducing the axial distance between the upper end 32 of the lower retaining band, and the downwardly facing shoulder 46 on the upper snap ring 42. There are three ways this axial distance is shortened. First, whatever small space that may remain axially between any of the assembled parts 28, 20, 24 and 42 is extinguished. Second, there is lost-motion intentionally accommodated by rotational motion of parts of the sealing device 20, as is further described below. Thirdly, an axially central part of sealing device 20 is designed to elastically correspondingly compress axially and expand both radially inwardly and radially outwardly, as is further described below. In this way the annular space 18 between the outer fluid confining member and the inner fluid confining member 14 is effectively sealed-off at the site of the sealing device 20, creating a lower compartment 60 that is pressure-isolated from an upper compartment 62.

The sealing device 20 is a three-layer stack constituted by an annular elastomeric seal 64 coaxially sandwiched axially between a lower anti-extrusion ring 66 and an upper anti-extrusion ring 68.

More of the preferred details of the sealing device are now described with regard to FIGS. 3, 4 and 5.

Because the structure and functioning of the portion of the apparatus from imaginary axially-central, normally radiating plane CL axially upwards to the lower end shoulder 70 of the upper retaining band 40 is a mirror image about that imaginary plane relative to the portion of the apparatus from that imaginary plane axially downwardly to the upper end shoulder 32 on the lower retaining band 28, only the lower portion is shown in FIGS. 3–5.

Looking at FIG. 3, the annular elastomeric seal 64 is a ring made of any elastomeric material conventionally used for annulus seals in the same environment as the one where the sealing device of the present invention may be being put to use. For instance neoprene, rubbery ABS plastic and the like may be used, with or without embedded, internal skeletal materials such as layers of woven or non-woven textile material, randomly distributed fiberous material, woven metallic wire fabric or the like.

As shown the ring 64 is of roughly-rectangular longitudinal cross-sectional shape, although somewhat thicker at the middle due to an external bulge 72 and reliefs 74 at the upper and lower outer corners which cause the profile to be increasingly somewhat less thick and somewhat less long as one approaches the corner than would be the case if the ring were more truely rectangular in longitudinal cross-sectional shape. In effect each relief constitutes a circumferential groove at the respective corner, which groove remains generally convex in profile, rather than concave as most grooves are, merely because it is superimposed on an outside corner.

The anti-extrusion ring 66 looks in longitudinal section somewhat like a hockey stick, in that it has a generally radially extending body portion 76 somewhat cocked relative to a thinner lip 78 that extends generally axially from the radially outer, axially inner corner of the body portion. Actually, the rings 66, 68 are annular; each is an integral member and the portions 76 and 78 thereof both are annular.

In the relaxed state shown in FIGS. 1 and 3, both the seal ring 64 at the radially outer peripheral surface 80, even at the bulge 72 thereof, and the anti-extrusion rings 66, 68 at the radially inner, generally cylindrically curved, shared outer peripheral surface thereof provide the aforementioned running clearance relative to the bore wall 12.

The profile of the inside corner of the ring body/ring lip transitional region 82 generally follows and is received in the relief groove 74, with there being a small cavity 84 in the vicinity of the axially outer end of the radially outer sidewall surface 86 of the seal member 64.

Although at this initial, relaxed stage, the substantially cylindrically curved, radially inner surface 80 of the seal member 64 is fairly snuggly related to the radially outer surface 16 of the radially inner fluid confining member 14, the radially inner corners of the anti-extrusion ring body 76 both are radially gapped from the radially outer surface 16. Because the anti-extrusion ring body is cocked when relaxed, the radially inner peripheral sidewall 90 of the anti-extrusion ring body has more clearance from the surface 16 at its axially outer corner 92 than at its axially inner corner 94, yet sufficient running clearance even at 94.

In the relaxed state, its radially inner, axially outer corner is the only place where the body of each anti-extrusion ring engages the respective axially adjacent end surface of the respective axially adjacent retaining band 28 or 40, and that at long a respective circular line of engagement, denoted by the points P, that is spaced part way radially outwardly along the respective end surface from the radially outer peripheral wall 16 of the part 14. Accordingly, an annular cavity that is of wedge-shaped longitudinal section is provided at 96. It should be noticed that there are four additional cavities provided in the relaxed state of the sealing device 20, two related to each anti-extrusion ring. Each is annular in extent and results from the Belville (beveled) washer-like shallow frusto-conical shape of the bodies 76. For each ring 66, 68, one of these cavities 98 is located between the corresponding radially inner portions of the axially inner face 100 of the ring body and the adjacent axial end face 88 of the seal member 64. The respective cavity 96 communicates with the respective cavity 98 through the clearance gap at 94. For each ring 66, 68, the other of these cavities 102 is located between the corresponding axially outer face 104 of the ring body and the adjacent axial end face of the respective retaining band 28 or 40. Note that the axially outer faces 104 have a lesser radial extent than the annular space 18.

Comparing FIG. 4 with FIG. 3, as the seal member 20 begins to be axially compressed, the body 76 is resiliently deflected from being beveled to being flat. As the axially inner, radially inner corner of the body 76 engages the surface 16 of the inner part, and the free end 106 of the resilient lip 78 engages the surface 12, further axial compression of the sealing device forces the contact point P radially inwards and causes the lip 78 to progressively resiliently load against and be deflected by the progressive engagement of its radially outer peripheral surface 108. Also at this time, the shape of the elastomeric seal ring 64 undergoes largely reversible changes: in being axially squeezed between the surfaces 100 of the two anti-extrusion rings, it is radially expanded both inwardly and outwardly so that it sealingly engages both the surface 12 and the surface 16 effectively sealingly blocking the annulus 18 at the level of the sealing device 20 and thus separating the annular space into first and second compartments 60, 62 on axially opposite sides of the sealing device 20. Not all of the change in axial length is accommodated by radial expansion. Some of the change is accommodated by extinction or partial extinction of the various cavities initially provided, as can be seen by sequentially viewing FIGS. 3–5. Accordingly, flow is accommodated between the anti-extrusion rings 66, 68.

The frusto-conically tapered end surfaces 110 on the free ends 106 redirect the flow of elastomeric material away from tending to extrude between the respective anti-extrusion ring and the outer part 10. Extrusion is prevented at the radially inner interface between the respective anti-extrusion ring and inner part by early engagement of the radially inner, axially inner corner 94 of the respective anti-extrusion ring with the inner part 14.

In essence, whereas when the sealing device 20 when in its unloaded condition has a running clearance, as soon as it begins to be axially compressed, the anti-extrusion rings close off the annulus and trap the elastomeric seal between them so that its material is redistributed in a largely reversible, controlled manner between the two anti-extrusion rings.

When the axial loading is removed, e.g. by running-out the set screws 52 the elastomeric seal ring 64 returns to its relaxed position and shape and the anti-extrusion rings regain about half or so of the degree of their original bevelled shape. Accordingly the parts of the sealing device 20 release their grip on the surface 12 and provide a pulling clearance to permit easy axial withdrawal of the device 20 or of the device 20 and part 14 from the bore 13.

Whereas only one sealing device 20 is shown, a stack of such devices could be similarly used.

Use of the deflectible lip device 20, e.g. in a wellhead provides several advantages over know sealing devices having extrusion-limiting structures:

(a) The seal elements are not chewed-up or destroyed by the pressure loads.

(b) A metal-to-metal seal provides full containment of the sealing element without cutting.

(c) Running clearance is provides to compensate for irregularities inside the well or on the casing or tubing and allows for easy installation.

(d) Pulling clearance is provided when the non-extrusion rings assume their relaxed position allowing for easy removal.

(e) The entire test load can be absorbed across the set screws instead of the hanger.

(f) Eliminates the necessity of having a bowl or shoulder to set the packoff in.

(g) A stored energy, or dynamic type seal is established.

The second embodiment, shown in FIGS. 6-10 is very similar to the first embodiment shown in FIGS. 1-5. Accordingly, the following description is focussed on the differences.

In this version, the object is to form a loaded seal in the annulus A between the outside of the pipe B and the bore wall of the part C in which the pipe B is received. In this instance, the pipe B is hung in the bore of the part C using a set of conventional pipe slips D. A sealing device E provided in accordance with the present invention is run into the annulus A axially behind the slips D until it comes to rest upon the slip assembly.

The sealing device E is an assembly of annular parts, shown including a lower retaining member F, an intermediate retaining member G and an upper retaining member H.

The lower and intermediate retaining members are keyed together at I to provide for limited axial lost motion therebetween, in a sense to increase and decrease the length of the radially inwardly opening recess J defined in the lower end of the bore of the intermediate retaining member between the opposed shoulders K, L on tubular flange M on the lower retaining member F and the intermediate retaining member G.

The upper and intermediate retaining members H and G are maintained in an associated condition by a retainer band N secured about the tail of the intermediate retaining member G axially behind the upper retaining member H with sufficient axial spacing to provide for the amount of axial lost motion between members H and G that can be seen by comparing FIGS. 6 and 7. This motion increases and descreases the length of the radially outwardly opening recess O defined on the upper end of a larger diameter portion of the intermediate retaining member between the opposed shoulders Q, R on the tubular flange S on the upper retaining member H and the intermediate retaining member G.

Each of the recesses J, O receives a respective seal comprising an elastomeric seal ring 64', 64", confined between a respective two anti-extrusion rings 66', 68', and 66", 68". Running clearances are provided as for the first embodiment. The sealing devices are activated by running in the set screws T which bear down on the wedging end surface U provided on the axially trailing end of the intermediate retaining member.

As the act of running in the set screws axially shortens the sealing device, the two recesses J, O are correspondingly axially shortened, reversibly activating the seals in much the same way, one being a mirror image of the other as seen in longitudinal section.

Accordingly, only the radially outer one of the seals (64', 66', 68') is illustrated in detail in the stage drawings - FIGS. 8, 9 and 10, as exemplary of both this seal and the other one (64", 66" and 68").

As can be seen from FIGS. 8, 9 and 10, the action upon loading is much the same as in the first embodiment. Note, however, the relief at V which provides an additional cavity W to be filled by elastomeric material of the ring 64' as the set screws are run in.

It should now be apparent that the annulus sealing device as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

What is claimed is:

1. For sealing an annulus defined between a pair of coaxially-related radially inner, radially outwardly facing and radially outer, radially inwardly facing circumferentially extending at least generally cylindrical surfaces at a level intermediate the common axial extent of these surfaces;

a sealing device comprising:

a ring of elastomeric material sandwiched coaxially between two anti-extrusion rings made of elastic hard metal or the like;

this sandwich of rings being capable of providing, in a free state, a circumferential clearance radially between itself and at least one of said surfaces when received in said annulus at said level, at least before having ever been used to seal said annulus at said level;

each anti-extrusion ring comprising an annular ring integrally provided at one radial extreme thereof with a circumferentially extending lip;

the ring of elastomeric material having two axially opposite ends, a radially inner circumferential sidewall surface and a radially outer circumferential sidewall surface;

the bodies of said anti-extrusion rings, when said sealing device is in said free state, being at least generally frustoconically beveled, and being then so related to the ring of elastomeric material that is sandwiched between them that the anti-extrusion rings axially confront the axially opposite ends of the ring of elastomeric material to a greater degree toward the radial extent thereof which corresponds to that from which the respective lips extend, said lips also then extending axially generally towards one another at obtuse angles to the respective said bodies;

the sealing device being so constructed and arranged that when received in said annulus at said level and axially compressed, the bodies of the two anti-extrusion rings tend to de-bevel toward greater flatness in a sense which forces the respective lips to contact and progressively deflect against the correspondingly adjacent said cylindrical surface and in resilient sealing engagement therewith while the body of each anti-extrusion ring at the opposite radial extreme thereof from said one radial extreme adjacently confronts the other of said cylindrical surfaces, whereupon continuing axial compression of the sealing device forces the ring of elastomeric material to expand radially both inwards and outwards, into resilient sealing engagement with both of said cylindrical surfaces.

2. The sealing device of claim 1, wherein:

in said free state said anti-extrusion ring bodies have axially oppositely directed non-confronting faces which are obliquely directed; and said sealing device further includes two annular retainer bands which coaxially sandwich between them the sandwich constituted by said two anti-extrusion rings and said ring of elastomeric material;

these annular retainer bands having respective, at least generally flat end surfaces confronting the respective said obliquely directed faces of said anti-extrusion rings, so that, as said annular retainer bands are compressed axially relatively towards one another, said bodies of said anti-extrusion rings tend to de-bevel against said generally flat end surfaces.

3. The sealing device of claim 2, wherein:

one of said annular retainer bands includes means for securing that band at a fixed height in said annulus; and the other of said annular retainer bands includes surface means oriented to receive an applied mechanical force having a tendency to move this annular retainer band axially toward said one, fixed-height annular retainer band.

4. The sealing device of claim 3, wherein:

said surface means is constituted by means defining a pluality of radially-accessible, equi-angularly distributed slope-walled recesses in said other annular retainer band, positioned to be engaged by the noses of set screws run radially thereinto.

5. The sealing device of claim 3, wherein:

said surface means is constituted by an at least generally axially-facing shoulder on said other annular retainer band.

6. The sealing device of claim 3, wherein:

said other annular band has one of said generally cylindrical surfaces provided thereon;

said sealing device being adapted to seal a second annulus defined between said other annular band and a third generally cylindrical surface at a second level that is axially adjacent to and at least generally coaxial with respect to the first-described level, by further including:

a second ring of elastomeric material sandwiched coaxially between two second anti-extrusion rings made of elastic hard metal or the like;

this second sandwich of rings being capable of providing, in a free state, a circumferential clearance radially between itself and said third generally cylindrical surface when received in said second annulus at said second level, at least before having ever been used to seal said second annulus at said second level;

each second anti-extrusion ring and said second ring of elastomeric material sandwiched therebetween at least generally appearing in longitudinal cross-section be a mirror image of the first-described sandwich of two anti-extrusion rings and ring of elastomeric material;

a third annular retainer band which coaxially sandwiches between an at least generally axially facing shoulder means provided thereon and an opposed at least generally axially facing shoulder means on said other annular retainer band the second sandwich constituted by said two second anti-extrusion rings and said second ring of elastomeric material, so that as said third retainer band is compressed axially toward said one retainer band said second anti-extrusion rings tend to de-bevel against said axially facing shoulder means on said third and other retainer bands;

the third annular retainer band having surface means thereon oriented to receive an applied mechanical force having a tendency to move this annular retainer band axially toward said one, fixed-height annular retainer band.

7. The sealing device of claim 6, wherein:

said first sandwich is adapted to provide said running clearance radially inwardly thereof and the lips of the respective two anti-extrusion rings in the free state angle obliquely radially inwardly, so that the respective said ring of elastomeric material bulges primarily radially inwardly upon compression of the respective anti-extrusion rings axially relatively towards one another.

8. The sealing device of claim 6, further including:

means pinning said one and other retainer bands together for limited axial movement therebetween; and means pinning said other and third retainer bands together for limited axial movement therebetween, whereby said sealing device may be handled as an assembled unit even when in said free state, and wherein said limited axial movement permits sufficient seal compression to effect resilient sealing between both the third and other generally cylindrical surfaces and said sealing device.

9. A sealing assembly, comprising:

a radially outer fluid-confining element having a radially inwardly facing circumferentially extending at least generally cylindrical surface;

a radially inner fluid-confining element having a radially outwardly facing circumferentially extending at least generally cylindrical surface;

the two at least generally cylindrical surfaces being coaxially disposed with spacing radially between them providing an annulus;

means for sealing-off said annulus at a level intermediate the common axial extent of these surfaces, said sealing device comprising:

a ring of elastomeric material sandwiched coaxially between two anti-extrusion rings made of elastic hard metal or the like;

this sandwich of rings being capable of providing, in a free state, a circumferential clearance radially between itself and at least one of said surfaces when received in said annulus at said level, at least before having ever been used to seal said annulus at said level;

each anti-extrusion ring comprising an annular ring integrally provided at one radial extreme thereof with a circumferentially extending lip;

the ring of elastomeric material having two axially opposite ends, a radially inner circumferential sidewall surface and a radially outer circumferential sidewall surface;

the bodies of said anti-extrusion rings, when said sealing device is in said free state, being at least generally frustoconically beveled, and being then so related to the ring of elastomeric material that is sandwiched between them that the anti-extrusion rings axially confront the axially opposite ends of the ring of elastomeric material to a greater degree toward the radial extent thereof which corresponds to that from which the respective lips extend, said lips also then extending radially generally towards one another at obtuse angles to the respective said bodies;

the sealing device being so constructed and arranged that when received in said annulus at said level and axially compressed, the bodies of the two anti-extrusion rings tend to de-bevel toward greater flatness in a sense which forces the respective lips to contact and progressively deflect against the correspondingly adjacent said cylindrical surface and in resilient sealing engagement therewith while the body of each anti-extrusion ring at the opposite radial extreme thereof from said one radial extreme adjacently confronts the other of said cylindrical surfaces, whereupon continuing axial compression of the sealing device forces the ring of elastomeric material to expand radially both inwards and outwards, into resilient sealing engagement with both of said cylindrical surfaces.

10. The sealing assembly of claim 9, wherein:

in said free state said anti-extrusion ring bodies have axially oppositely directed non-confronting faces which are obliquely directed; and said sealing device further includes two annular retainer bands which coaxially sandwich between them the sandwich constituted by said two anti-extrusion rings and said ring of elastomeric material;

these annular retainer bands having respective, at least generally flat, end surfaces confronting the respective said obliquely directed faces of said anti-extrusion rings, so that, as said annular retainer bands are compressed axially relatively towards one another, said bodies of said anti-extrusion rings tend to de-bevel against said generally flat end surfaces.

11. The sealing assembly of claim 10, wherein:

one of said annular retainer bands includes means for securing that band at a fixed height in said annulus; and the other of said annular retainer bands includes surface means oriented to receive an applied mechanical force having a tendency to move this annular retainer band axially toward said one, fixed-height annular retainer band.

12. The sealing assembly of claim 11, wherein:

said surface means is constituted by means defining a plurality of radially-accessible equi-angularly distributed slope-walled recesses in said other annular retainer band, positioned to be engaged by the noses of set screws run radially thereinto.

13. The sealing assembly of claim 11, wherein:

said surface means is constituted by an at least generally axially-facing shoulder on said other annular retainer band.

14. The sealing assembly of claim 11, wherein:

said other annular band has one of said generally cylindrical surfaces provided thereon;

said sealing device being adapted to seal a second annulus defined between said other annular band and a third generally cylindrical surface at a second level that is axially adjacent to and at least generally coaxial with respect to the first-described level, by further including:

a second ring of elastomeric material sandwiched coaxially between two second anti-extrusion rings made of elastic hard metal or the like, this second sandwich of rings being capable of providing, in a free state, a circumferential clearance radially between itself and said third generally cylindrical surface when received in said second annulus at said second level, at least before having ever been used to seal said second annulus at said second level;

each second anti-extrusion ring and said second ring of elastomeric material sandwiched therebetween at least generally appearing in longitudinal cross-section be a mirror image of the first-described sandwich of two anti-extrusion rings and ring of elastomeric material;

a third annular retainer band which coaxially sandwiches between an at least generally axially facing shoulder means provided thereon and an opposed at least generally axially facing shoulder means on said other annular retainer band the second sandwich constituted by said two second anti-extrusion rings and said second ring of elastomeric material, so that as said third retainer band is compressed axially toward said one retainer band said second anti-extrusion rings tend to de-bevel against said axially facing shoulder means on said third and other retainer bands;

the third annular retainer band having surface means thereon oriented to receive an applied mechanical force having a tendency to move this annular retainer band axially toward said one, fixed-height annular retainer band.

15. The sealing assembly of claim 14, wherein:

said first sandwich is adapted to provide said running clearance radially inwardly thereof and the lips of the respective two anti-extrusion rings in the free state angle obliquely radially inwardly, so that the respective said ring of elastomeric material bulges primarily radially inwardly upon compression of the respective anti-extrusion rings axially relatively towards one another.

16. The sealing assembly of claim 14, wherein:

means pinning said one and other retainer bands together for limited axial movement therebetween; and means pinning said other and third retainer bands together for limited axial movement therebetween, whereby said sealing device may be handled as an assembled unit even when in said free state, and wherein said limited axial movement permits sufficient seal compression to effect resilient sealing between both the third and other generally cylindrical surfaces and said sealing device.

17. The sealing assembly of claim 16, wherein:

said assembly further includes a radially outermost fluid-confining element having a radially inwardly facing circumferentially extending at least generally cylindrical surface constituting said third generally cylindrical surface.

18. The sealing assembly of claim 9, wherein:

one of said fluid-confining elements is provided with two axially-spaced shoulder means which project from the respective generally cylindrical surface part-way radially across said annulus axially outside said sealing device but in interfering relation therewith so that said sealing device may be carried to said level in said free state by being trapped on the respective fluid-confining element between said shoulder means.

* * * * *